United States Patent
Murray (10) Patent No.: US 7,921,353 B1
(45) Date of Patent: Apr. 5, 2011

(54) METHOD AND SYSTEM FOR PROVIDING CLIENT-SERVER INJECTION FRAMEWORK USING ASYNCHRONOUS JAVASCRIPT AND XML

(75) Inventor: Gregory L. Murray, Santa Clara, CA (US)

(73) Assignee: Oracle America, Inc., Redwood City, CA (US)

( * ) Notice: Subject to any disclaimer, the term of this patent is extended or adjusted under 35 U.S.C. 154(b) by 805 days.

(21) Appl. No.: 11/784,902

(22) Filed: Apr. 9, 2007

(51) Int. Cl.
*G06F 17/00* (2006.01)
*G06F 7/00* (2006.01)
*G06F 17/30* (2006.01)

(52) U.S. Cl. ........ 715/200; 715/201; 715/202; 715/234; 707/722; 707/732; 707/736; 707/755

(58) Field of Classification Search ................ 715/200, 715/204–208, 234, 240, 243, 201, 202; 707/722, 707/732, 736, 755
See application file for complete search history.

(56) References Cited

U.S. PATENT DOCUMENTS

| | | | |
|---|---|---|---|
| 7,103,642 B1* | 9/2006 | Chen et al. | 709/218 |
| 2002/0138331 A1* | 9/2002 | Hosea et al. | 705/10 |
| 2003/0101412 A1* | 5/2003 | Eid | 715/513 |
| 2004/0006743 A1* | 1/2004 | Oikawa et al. | 715/513 |
| 2005/0108648 A1* | 5/2005 | Olander et al. | 715/744 |
| 2005/0108732 A1* | 5/2005 | Musson et al. | 719/328 |
| 2005/0256940 A1* | 11/2005 | Henderson et al. | 709/219 |
| 2006/0259462 A1* | 11/2006 | Timmons | 707/3 |
| 2006/0277248 A1* | 12/2006 | Baxter et al. | 709/201 |
| 2007/0073701 A1* | 3/2007 | Miller et al. | 707/10 |
| 2007/0130293 A1* | 6/2007 | Dong et al. | 709/219 |

OTHER PUBLICATIONS

Jitesh Pillai, "Like Yahoo, Google Adds Customized Search Engine", Saturday, Oct. 28, 2006, Google Search Engine, pp. 1-4.*

* cited by examiner

*Primary Examiner* — Chau Nguyen
(74) *Attorney, Agent, or Firm* — Martine Penilla & Gencarella, LLP (57) ABSTRACT

A method and system for dynamically loading content to a portion of a native global page on a client at runtime includes receiving a request at the client for the content for the portion of the native global page. The request identifies the portion of the native global page requesting the content and a type of resource required from a server. The request, identifying a server side resource to service the request, is forwarded from the client to the server. In response to the request, the client receives the identified server side resource that includes a plurality of components. The plurality of components is parsed at the client to verify the components are received in a required sequence. When it is determined that the plurality of components are received in the required sequence, a first set of components are selected from the received plurality of components and injected into a region for the portion of the native global page. A second set of components are selected from the received plurality of components and integrated into the native global page, such that the integrated components when executed are executed in the global scope of the native global page.

19 Claims, 7 Drawing Sheets

METHOD AND SYSTEM FOR PROVIDING CLIENT-SERVER INJECTION FRAMEWORK USING ASYNCHRONOUS JAVASCRIPT AND XML

FIELD OF THE INVENTION

The present invention relates generally to client-server computing systems, and more particularly to, a method and system for providing a Client-Server Injection Framework using Asynchronous JavaScript And XML (AJAX).

BACKGROUND

Description of the Related Art

A webpage is a resource of information that may be accessed locally or from remote servers using a web browser. The webpage consists of files and contents that are either static in nature or are dynamic with the contents provided "on-the-fly" when requested by the web browser. A webpage may include contents from a single HTML file or may include contents from several HTML files. One way of representing multiple HTML files on a single webpage is by use of frames. Frames use HTML techniques to display multiple independent sections within the single webpage with each section represented by a frame. The contents of each section (frame) maybe provided from a different HTML file. The frames have independent navigation allowing one to independently interact with each of the frame. Although frames provide the necessary technique to represent multiple HTML files in a single webpage, frames have their own drawbacks. Content loaded using a frame will have a separate navigation context which makes page flow difficult. The embedded content will also have a separate and JavaScript and CSS context which further makes the embedded content less integrated with the contain page. Frames can be less desirable for composing JavaScript centric widgets as sizing and re-sizing can be difficult with frames.

To overcome the problems of using frames in webpages, portlets were employed. A portlet is a reusable web component that generates dynamic content. Portlets are platform independent Java classes compiled to an architecture neutral bytecode that can be loaded dynamically into and run by a web server. Portlets provide similar functionality as the frames with multiple HTML files represented on a single webpage. However, portlets came with their own set of issues and problems. When the portlets are loaded on the webpage, the whole webpage is refreshed. This feature of having the whole webpage refresh every time a portlet is loaded leads to inefficient use of networking and processing resources. The problem gets exacerbated when multiple portlets on a webpage have to be loaded.

In view of the foregoing, there is a need for a method and system that will overcome the aforementioned problems by providing a framework for a client side JavaScript Engine that can manage client-side events, load and inject new content on the client dynamically, and interact with server side components while effectively and efficiently using network and processing resources.

SUMMARY

The present invention fills the need by providing a framework that is divided between a client and a server for dynamic loading of webpage contents at runtime. The framework includes a client-side JavaScript Engine in asynchronous communication with a server-side Injector servlet. The client-side JavaScript engine manages the events on the client and forwards requests to the server-side component which may be a servlet, JSF component or static resource which exists in the same domain as the original request page. The JavaScript engine may be used in combination with a server-side Injector servlet which manages the events on the server and responds to the requests from the client-side JavaScript Engine using asynchronous communication. The data returned by the server-side Injector servlet are dynamically loaded into the webpage on the client so that the data when executed, executes within a global scope of the webpage on the client. It should be appreciated that the present invention can be implemented in numerous ways such as a system or a method.

In one embodiment, a method for dynamically loading content for a portion of a native global page on a client at runtime, is disclosed. The method includes receiving a request at the client for a content associated with the portion of the native global page. The request identifies the portion of the native global page requesting the content and a type of resource required from a server. The request is forwarded from the client to the server. In response to the request, the client receives the identified server side resource that includes a plurality of components. The client parses the plurality of components to ensure the components are received in a required sequence. When it is determined that the plurality of components are received in the required sequence, a first set of components are selected from the plurality of components and injected into a region associated with the portion of the native global page. A second set of components are selected from the received plurality of components and integrated into the native global page, such that the integrated components when executed are executed in the global scope of the native global page.

In another embodiment, a system for dynamically loading content to a portion of a native global page on a client at runtime is described. The system includes a JavaScript Engine on the client and an Injector servlet on a server. The JavaScript Engine is configured to receive and handle a request that is triggered by an event at the client. The request includes a plurality of content parameters that define a type of resource required from the server and the portion of the native global page from which the content request originated. The JavaScript engine, in turn, includes a dynamic content receipt handler, a resource parser and a resource executioner. The dynamic content receipt handler is configured to receive a server side resource that includes a plurality of components associated with the request based on the content parameters. The resource parser is configured to parse the received server side resource to identify the plurality of components, ensure the plurality of components are received in a required sequence and to identify and inject a first set of components from the plurality of components into a region for the portion within the native global page in the order the components appear in the portion of the native global page. The resource executioner is configured to identify a second set of components from the received plurality of components of the server side resource and to integrate the second set of the plurality of components with a global list of components pre-existing on the native global page, in the order they appear on the native global page so that the second set of the plurality of components of the server side resource when executed, execute in the global scope of the native global page. The injector servlet on the server is configured to receive the request forwarded by the JavaScript Engine on the client, evaluate the request, identify a server side resource and to forward the identified server side resource to the client in response to the request received from the client.

The present invention, thus, describes a method and system for dynamically loading content to a portion of a native global page on a client at runtime. The embodiments of the present invention provide the contents to the client using asynchronous communication. The contents are loaded and rendered on the client dynamically thereby providing up-to-date information on the client without overloading the network or processing resources.

BRIEF DESCRIPTION OF THE DRAWINGS

The invention may best be understood by reference to the following description taken in conjunction with the accompanying drawings. These drawings should not be taken to limit the invention to the preferred embodiments, but are for explanation and understanding only.

DETAILED DESCRIPTION

The present invention provides a framework divided between a client and a server for dynamically loading content to a portion of a native global page at the client during runtime. The framework provides logic on the client that may be used to interact with server-side logic to dynamically load specific content to a portion of a native global page on the client asynchronously from the server without the need for reloading the whole page. Several embodiments for dynamically loading content to a portion of a native global page rendered at the client are described. It should be appreciated that the present invention can be implemented in different ways such as a system or a method. It will be apparent to those skilled in the art that the present invention may be practiced without some or all of the specific details set forth herein.

To facilitate an understanding of the embodiments, a generic client-server computing system with a generic template of a typical webpage rendered at the client will be described first. The process of the disclosed embodiments will then be described with reference to the generic template. In the current application, browser, browser client and client are used interchangeably to refer to a client in a client-server computing system. A client is a computer or computing device that runs client software (referred to as a browser) to access the Internet and render content.

Figure 1:
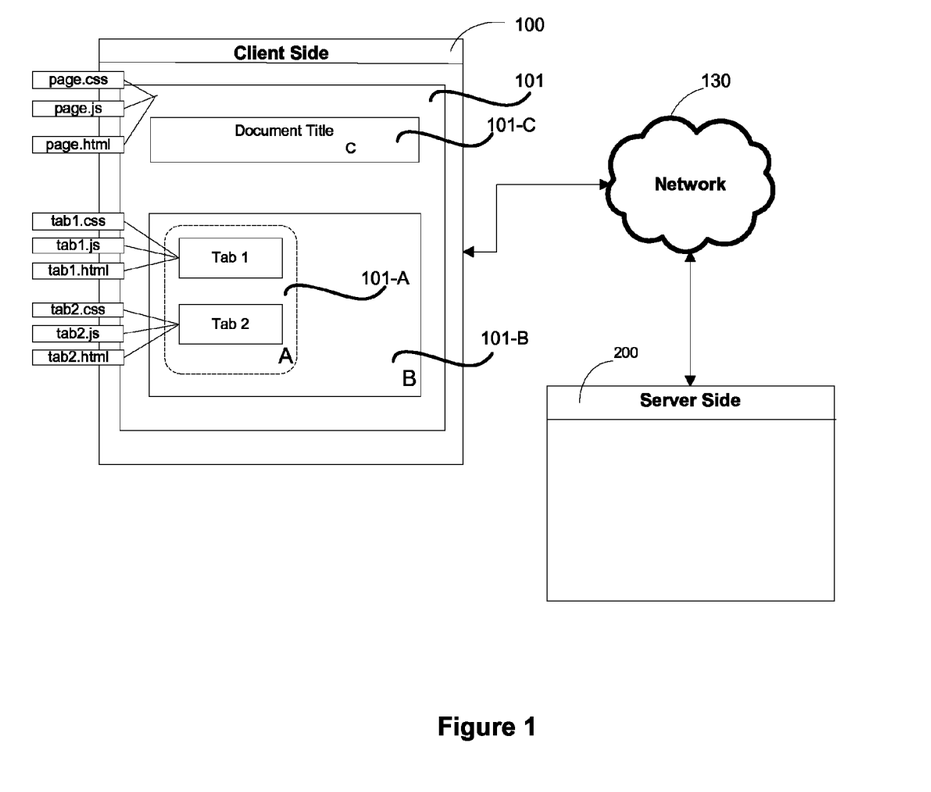
FIG. 1 illustrates a standard template of a webpage rendered on the client, in one embodiment of the invention.

FIG. 1 illustrates a generic client-server computing system with a generic template of a native global page (webpage) 101 rendered at a client 100, in one embodiment of the invention. The client 100 is a computer or computing system that runs client software (referred to as a browser). In addition to the browser, the client 100 may include software in the form of a JavaScript engine (not shown). The JavaScript engine is a JavaScript code that is made available to the webpage and to other applications running on the client 100. The JavaScript engine is configured to manage the events, interact with other objects on the client 100 and with a server 200, receive and render data forwarded by the server 200. An AJAX engine (not shown) available at the client 100 is configured to interact with the JavaScript engine and with the server 200 using asynchronous communication. The AJAX engine may be integrated within the JavaScript engine or may be available to the JavaScript engine. The AJAX engine is also a JavaScript code that is made available to any application running on the client 100. In one embodiment, JavaScript is sometimes referred to as the "ECMAScript". ECMAScript is available as "Standard ECMA-262: ECMAScript Language Specification", which is herein incorporated by reference. The AJAX engine is configured to interact with other objects on the client 100 and with the server 200 asynchronously. The AJAX engine forwards requests for resources to the server 200 and receives data from the server 200 asynchronously. The data for a portion of the webpage is loaded and rendered on the client 100 using the JavaScript Engine dynamically without having to re-load the entire content of the webpage.

A native global page (webpage) 101, includes a plurality of regions, region A 101-A, region B 101-B, region C 101-C, with each region associated with one or more contents. When the initial webpage 101 is loaded, contents for some of the regions may be loaded during the initial load of the webpage and some of the regions may be loaded on an as-needed basis. For example, in the embodiment illustrated in FIG. 1, content related to region C 101-C may be rendered during the initial load of the webpage 101 and Regions A 101-A and B 101-B may include contents that may be rendered on an as-needed basis.

The contents associated with the different regions may be received from a single source or from a plurality of sources on the server 200 and may be of type text, image, graphic user interface, video, audio or any combinations thereof. The types of content available on a webpage are not restricted to the ones listed above but may contain other forms so long as they may be rendered on a webpage and accessed. Each of the contents includes a plurality of components associated with it such as HTML code, cascading style sheets and JavaScript code. The HTML codes and cascading style sheets (CSS) for the contents of each portion are injected into an appropriate region of the webpage and the associated JavaScript codes are initialized, evaluated and executed such that the contents are rendered in the appropriate region of the webpage.

Referring to FIG. 1, A, B and C represent regions within the webpage 101. The contents of A and B are not loaded when the initial native webpage is rendered. When the content of A and/or B need(s) to be updated or loaded, a request for appropriate resource is sent from the client 100 to a server 200 asynchronously. The server 200 returns a plurality of components in the form of HTMLs, CSSs, and JavaScripts in response to the request. The plurality of components are then identified, loaded, associated with the appropriate region of the webpage 101, evaluated and executed so that the contents may be rendered in the appropriate region of the webpage 101.

By providing a framework that includes a JavaScript engine along with an AJAX engine on the client 100 interacting with a server 200 using asynchronous communications, an effective mechanism is provided to dynamically load content to a portion of a webpage 101 and render the portion during runtime, without having to re-load the entire content of the webpage 101 on the client 100. This is especially useful in instances where more than one portion has to be loaded/re-loaded on the client 100. Using this mechanism, only affected data are uploaded resulting in effective use of the network and processing resources while maintaining the integrity of the remaining contents of the webpage 101 on the client 100 in an efficient and effective manner.

It is noteworthy that the present invention is not limited to the architecture of FIG. 1. For example, hand-held computers, notebook or laptop computers, set-top boxes or any other computing system (wired or wireless) capable of connecting to the Internet and running computer-executable process operations, as described below, may be used to implement the various aspects of the present invention. Additionally, the software program, in general, should be viewed as pieces of code, and such code can be written in other languages so long as its functionality enables the process operations of the present invention.

Figure 2A:
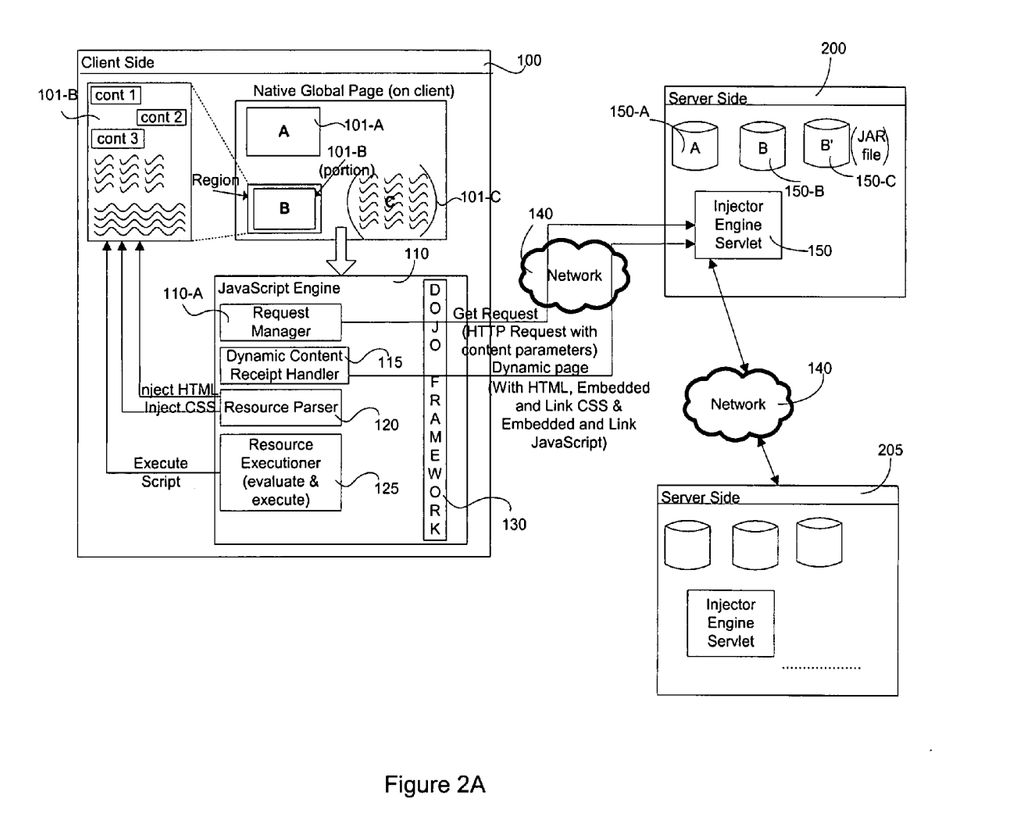
FIGS. 2A and 2B illustrate an overview of a client-server computing system involved in dynamically loading content to a portion of a native global page, in one embodiment of the invention.

A detailed overview of a client-server system and system resources involved in carrying out the present invention will now be described with reference to FIGS. 2A and 2B. Referring to FIG. 2A, a client 100, in the client-server computing system illustrated in FIG. 1, may include software in the form of a JavaScript engine 110 on the client 100. The JavaScript engine 110 is a JavaScript code that is installed on the browser of the client 100 and is made available to an application running on the client 100. The JavaScript code of the JavaScript engine 110 either interacts with an AJAX engine, having asynchronous requests, available on the client 100 or includes asynchronous requests. The asynchronous requests enable asynchronous communication between the client 100 and a server 200.

The JavaScript engine 110 is configured to manage events related to a webpage 101 rendered on the client 100, forward requests for a server-side resource to a server 200, receive the server-side resource from the server 200 in response to the request, evaluate and load the data received from the server 200 onto the client 100 asynchronously. To accomplish this, the JavaScript engine 110 includes a runtime script in the form of a request manager 110-A to manage requests originating from the webpage 101 on the client 100, define and forward the requests to the server 200. The requests may originate at the client 100 in response to an event triggered on the webpage 101. The events that may trigger a request at the client 100 may include anyone of native global page load, a user action, such as menu clicks, or any other events. The request triggered by an event on the client 100 is for one or more contents to a portion of the webpage 101. As used herein, the term "script" should be broadly understood to include any type of program code which can be executed by one or more computing systems.

The request manager 110-A, in one embodiment of the invention, is a JavaScript object that is capable of interacting with the server 200 and with other objects on the client 100 including JavaScript objects. The request manager 110-A is configured to receive requests triggered by an event at the webpage 101, define the request and forward the request to a server 200. The request manager 110-A accomplishes this by first analyzing the request received from the webpage 101, identifies a type of resource required to service the request and a server that can provide the required resource. The request manager 110-A defines the request using a plurality of content parameters and forwards the request to the appropriate server 200. The content parameters may include, among other parameters, one or more of request identification, server identification that can provide the requested resource, type of resource required to service the request and the portion identification from where the request originated. The request from the webpage 101 may be for one of dynamic resource or static resource.

In one embodiment, an optional JavaScript framework interface in the form of Dojo framework 130 may be used at the client 100 to manage the communication with the server 200. The Dojo framework 130 is a platform independent communication mechanism that can be used on the client 100 to abstract any browser differences that may exist during the communication between the JavaScript engine 110 and the server 200. In this embodiment, the request is forwarded to the server 200 through the Dojo framework 130.

The server 200 is equipped with an Injector servlet 210. The Injector servlet 210, is configured to interact with other runtime scripts on the server 200 and with the JavaScript Engine 110. The Injector servlet 210 may be implemented using Java Servlet code, a Java Server Faces (JSF) code or any other technology so long as it is capable of interacting with other runtime scripts on the server 200 and with the JavaScript engine 110. The Injector servlet 210 manages requests received from the JavaScript engine 110 through a network 140, analyzes the request and identifies a server-side resource to service the request. The server-side resource includes a plurality of components available at the server 200 or available on other servers 205 that are accessible by the server 200 through the network 140. The Injector servlet 210 provides uniform access to all server side resources including static resource, dynamically generated resource and resource within a resource file. To provide a faster response for the requested resource, the Injector servlet 210 may cache commonly accessed content resource within a memory of the server 200. When the Injector servlet 210 receives a request for server-side resource, the Injector servlet 210 checks the cache first for the server-side resource, then a web root directory if the resource is unavailable in the cache and finally in the resource file available to the server 200.

The Injector servlet 210 forwards the identified resource including a plurality of components to the JavaScript engine 110 on the client 100, in response to the request. The plurality of components include CSSs (embedded and link), JavaScripts (embedded and link) and HTMLs. The Injector servlet 210 may forward the plurality of components for the dynamic resource to the client 100 individually or as a pooled response. In one embodiment, the Injector servlet 210 forwards the pooled response for the dynamic resource as a dynamic page with the identified components organized in a specific order.

Figure 3:
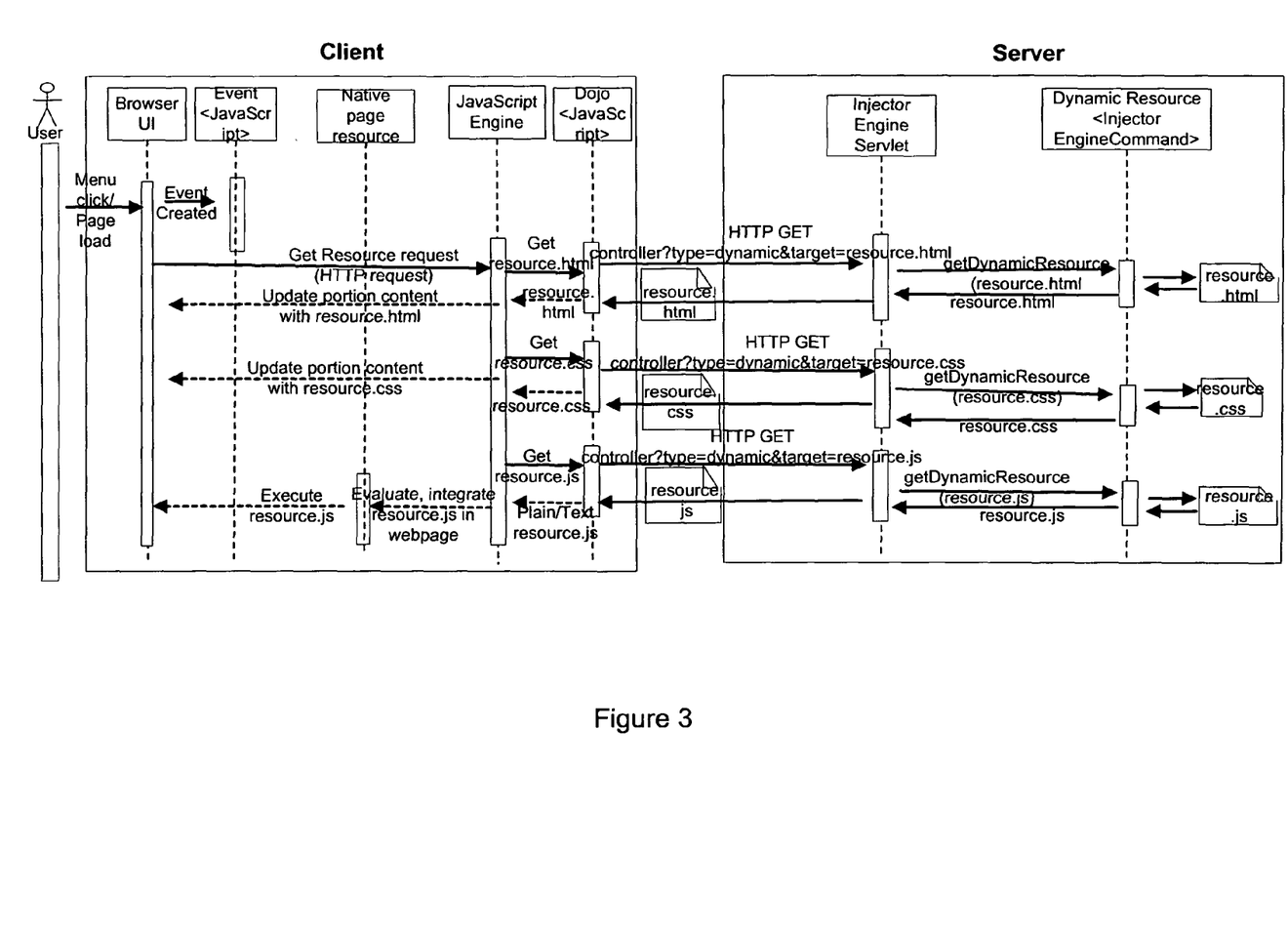
FIG. 3 illustrates a sequence diagram involved in executing various operations at a client and a server, in one embodiment of the invention.

To assist in the processing of the response received from the server 200, the JavaScript engine 110 on the client 100 includes a script in the form of a Dynamic Content Receipt Handler (DCRH) 115. The DCRH 115 is configured to interact with other objects on the client 100 and with the server 200 and, in one embodiment, is a JavaScript object. The DCRH 115 receives the plurality of components from the Injector servlet 210 and verifies to ensure that the plurality of components are received in a particular order. The DCRH 115, in one embodiment, receives the plurality of components through a Dojo framework 130. The order in which the plurality of components are to be received may be defined at the DCRH 115. In one embodiment of the invention, the order of receipt of the plurality of components is defined in the DCRH 115 as HTMLs first, followed by CSSs and finally JavaScripts as they relate to the content of the portion of the native global page 101, as illustrated in FIG. 3. In the embodiment where the plurality of components are received at the client 100 as a dynamic page 170, the dynamic page 170 is parsed to ensure that the plurality of components within the dynamic page are in the specific order. Although a specific order is mentioned in receiving the plurality of components, the invention is not restricted to this sequence and can receive the plurality of components in any other specified order so as to enable dynamic loading of the content to the portion of the native global page 101. Upon successful verification that the plurality of components have been received in the required order, the plurality of components are made available to other objects within the JavaScript engine 110. If the verification is unsuccessful, the DCRH 115 discards the plurality of components. In one embodiment, after discarding the plurality of components, the DCRH 115 provides an unsuccessful status to the server 200 so that the server 200 may attempt to re-send the plurality of components in the correct order.

In addition to DCRH 115, the JavaScript engine 110 includes a script in the form of a resource parser 120. The resource parser 120 is capable of interacting with other objects on the client 100, including the DCRH 11.5. In one embodiment of the invention, the resource parser 120 is a JavaScript object. The resource parser 120 is configured to receive the plurality of components from the DCRH 115, parse the plurality of components, identify a first set of components and inject the first set of components into a region associated with the portion of the native global page, in the order they are received from the server 200. In one embodiment, the first set of components, defined by HTMLs, embedded CSSs and embedded JavaScripts associated with the content for the portion of the native global page 101, are retrieved using Asynchronous JavaScript and XML (AJAX) interactions and injected using JavaScript manipulations of the HTML document (dynamic HTML techniques). The request from the client 100 identifies the portion and provides the necessary information to the resource parser 120 to enable successful injection of the identified first set of components into the appropriate region for the portion.

The resource parser 120 parses the plurality of components received from the server through the DCRH 115. The resource parser 120 identifies each of the components and constructs one or more lists of components. In one embodiment, the resource parser 120 identifies each of the components based on the type of component and constructs a list for each type of component. The type of component maybe one of HTML, embedded JavaScript, link JavaScript, embedded CSS or link CSS. The construction of the list of components is explained in greater detail hereunder with reference to FIG. 2B.

Figure 2B:
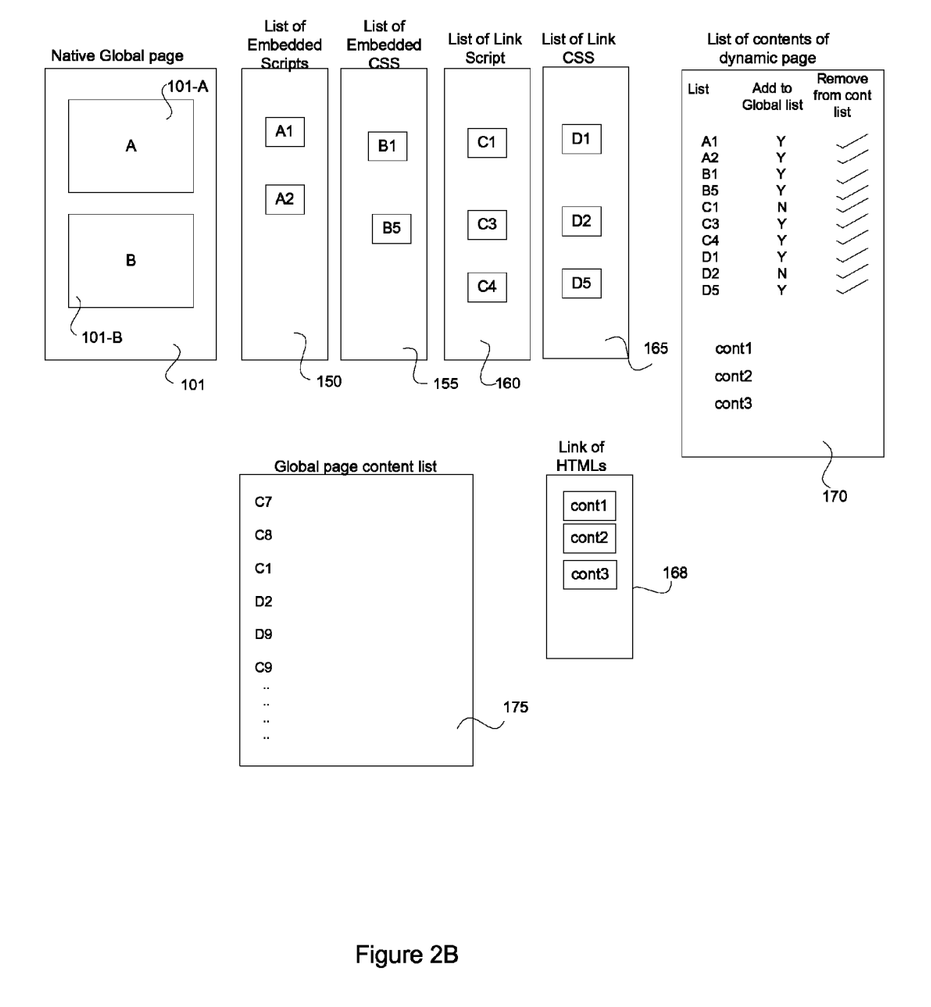

FIG. 2B illustrates a dynamic page 170 that includes a list of components associated with content for a portion B 101-B of the native global page 101 as received from a server 200, in one embodiment of the invention. This dynamic page 170 includes a plurality of HTMLs, embedded CSSs, link CSSs, embedded JavaScripts and link JavaScripts. Links, as used herein, refers to resources that are links to external resources. The resource parser 120 parses the plurality of components received from the server 200 and constructs a list of components based on the type of component parsed. Thus, the resource parser 120 constructs a list for each of embedded JavaScripts 150, embedded CSSs 155, link JavaScripts 160, link CSSs 165 and HTMLs 168 that includes appropriate components from the plurality of components parsed. In one embodiment of the invention where the plurality of components are included in a dynamic page 170, the resource parser 120 upon including a component into the respective list of components based on the type, may remove the component from the dynamic page 170. A plurality of flags or indicators may be used to track the components in the dynamic page during the parsing phase. In one embodiment, a remove-from-dynamic-page indicator may be used to successfully monitor the status of each of the components in the dynamic page. As and when, a component is parsed, identified and integrated into the appropriate list of component, the remove-from-dynamic-page indicator maybe set. At the end of the parsing phase, the components that have the remove-from-dynamic page indicator set, may be deleted from the dynamic page 170.

Upon successful construction of the lists of component based on the component type, the resource parser 120 identifies the first set of components from the lists of components and injects these components into an appropriate region for the portion of the native global page. In one embodiment, the identified first set of components include all the components from the lists of embedded JavaScripts 150, embedded CSSs 155 and HTMLs 168. As the embedded JavaScripts, embedded CSSs and HTMLs are specific to the content for the portion of the native global page, these components are injected and evaluated in the context of the portion of the native global page. The injection of the identified first set of components is carried out synchronously in the order they appear on the dynamic page 170.

Referring back to FIG. 2A, in addition to the DCRH 115 and the resource parser 120, the JavaScript engine 110 on the client 100 includes a script in the form of a resource executioner 125. The resource executioner 125 is capable of interacting with other objects on the client 100 of the JavaScript engine 110, including the DCRH 115 and the resource parser 120. In one embodiment of the invention, the resource executioner 125 is a JavaScript object. The resource executioner 125 is configured to receive the list of components from the DCRH 115, identify a second set of components from the list of components, integrate the identified second set of components into the components of the native global page 101, so that the components from the second set of components are initialized, evaluated and the JavaScripts executed in the global scope of the native global page 101. In one embodiment, the second set of components include Link CSSs that identify the style and format of the contents and Link JavaScripts that identify the behavior of the contents associated with the portion of the native global page 101.

In order to accomplish the integration of the second set of components with the components of the native global page 101, a global list of pre-existing components as they appear on the native global page 101 is maintained at the JavaScript engine 110 and is made available to the resource executioner 125. The resource executioner 125, after identifying the second set of components, compares the second set of components against the global list of components to identify those components that are not available in the global list of components. The resource executioner 125, then, integrates the identified components into the global list of components such that only one instance of each of the components is on the global list. The components are integrated synchronously in the order they appear on the list. The second set of components may include components from the lists of Link CSSs 160 and Link JavaScript codes 165. By integrating the identified components into the global list, the content for the portion of the native global page 101, when executed, are executed in the global scope of the native global page 101.

To further assist in the successful integration of the second set of components of the dynamic page with the global list of components of the native global page, a plurality of flags or indicators may be used. In one embodiment, an add-to-global-list indicator may be used to successfully monitor and identify the status of each of the components in the dynamic page 170. In an embodiment illustrated in FIG. 2B, the components from the second set of components are compared with the global list of components and the components that are available on the global list have the add-to-global-list indicator set to "N" and the components that are not available on the global list have the add-to-global-list indicator set to "Y" so that the appropriate components are integrated into the global list.

The operational details of an embodiment of the present invention using the resources available on the client 100 and the server 200 described with reference to FIG. 1, are now discussed with reference to FIG. 3. FIG. 3 illustrates the sequence logic of obtaining resource at the client 100. An application executing on a client 100 renders a webpage (native global page) 101 on the client 100. The webpage 101 rendered on the client 100 may include different types of data including a text, a picture, a graphic user interface, a video, an audio or any combinations thereof. It should be noted that the types of data available on a webpage are not restricted to the ones listed above but may contain other forms so long as they may be rendered on a webpage and accessed. A request for obtaining content for a portion of the webpage 101 is initiated on the client 100. The content may be for a portion that is not yet rendered or need updating. The request for the content may be triggered by an event, such as an 'onkeypress' or an 'onkeyrelease', related to the request on the client 100. The request includes a plurality of content parameters that identify the request, the type of resource required and a server 200 to which the request is mapped. The content parameters may include a Universal Resource Locator (URL) of the server 200, a request identification, content identification, content type, and content description. The request may be for a static resource, a dynamic resource or a resource from a resource file available to the server 200. A JavaScript engine 110 on the client 100 receives and processes the request. The JavaScript engine 110 interprets the request and creates a HTTP GET request to the server 200. In one embodiment, the HTTP GET request includes a request for dynamic resources from the server 200. The dynamic resource may include the style, format for the content to be rendered on the client 100, the dynamic code and the data associated with the content. In this embodiment, the dynamic resource may include resource.css (the cascading style sheet (both embedded and link) that defines the layout style), resource.html (the dynamic html code), resource.js (the JavaScript (both embedded and link) that defines the format) and data associated with the content.

The JavaScript engine 110 forwards the HTTP GET request to an Injection servlet 210 on the server 200 through a network (not shown). An optional server communication framework interface, such as Dojo framework 130, may be used to manage the communication with the server 200. The server communication framework is a platform independent communication mechanism that may be used on the client 100 or on the server 200 to abstract any browser differences that may exist during the communication between the client controller 110 and the server 200. In one embodiment illustrated in FIG. 2, the server communication framework, in the form of Dojo framework, is used on the client 100. Embodiments of the current invention are not restricted to a Dojo framework. Other server communication framework may be used so long as the framework is able to abstract any browser differences that may exist during the communication between the JavaScript engine 110 and the server 200.

The server 200 receives the HTTP GET request from the JavaScript engine 110 on the client 100 and analyzes the request. The Injection servlet 210 identifies the appropriate resource that can service the request. The identified resource may include a plurality of components, such as resource.html, resource.css and resource.js, available to the Injection servlet 210 on the server 200. The Injection servlet 210 extracts and forwards the identified plurality of components that define the server-side resource to the JavaScript engine 110, in response to the request. The Injection servlet 210 may forward the identified components individually or may pool the plurality of components into a pooled response and forward the pooled response as a dynamic page 170 to the client 100. The Injector servlet 210 forwards the plurality of components asynchronously to the JavaScript engine 110 on the client 100. In one embodiment where the Dojo framework is available on the client 100, the Injector servlet 210 forwards the response asynchronously to the JavaScript engine 110 through the Dojo framework mechanism. The JavaScript engine 110 on the client 100 receives the plurality of components for the server-side resource, ensures that the components are received in a specific order, constructs a list of components based on type of component, identifies and injects a first set of components into a region associated with the portion of the webpage 101, identifies and integrates a second set of components with the components of the webpage 101 so that when the components associated with the content for the portion of the webpage 101 is executed, the components are executed in the global scope of the webpage 101.

Figure 4:
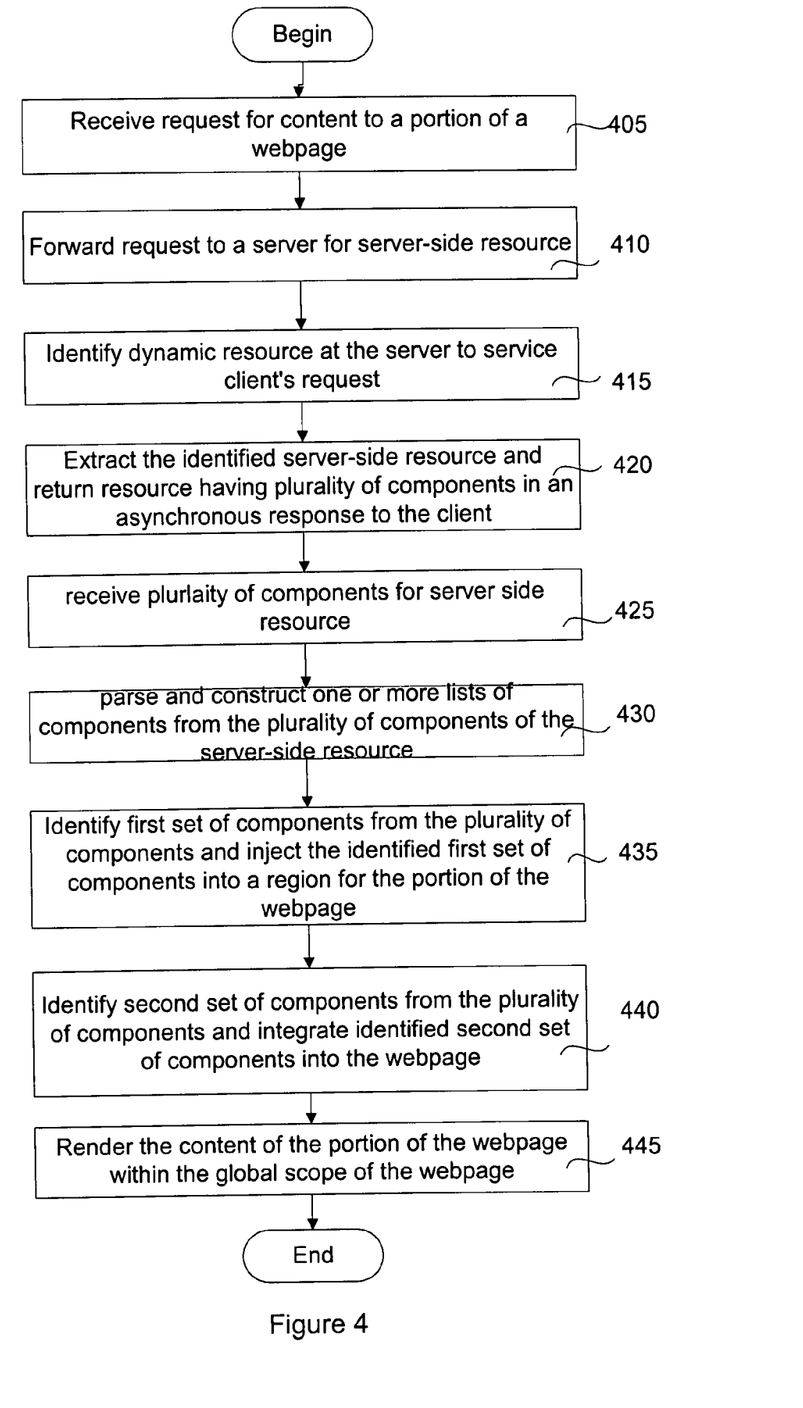
FIG. 4 illustrates a flow chart of the operations involved in dynamically loading content to a portion of a native global page, in one embodiment of the invention.
Figure 5:
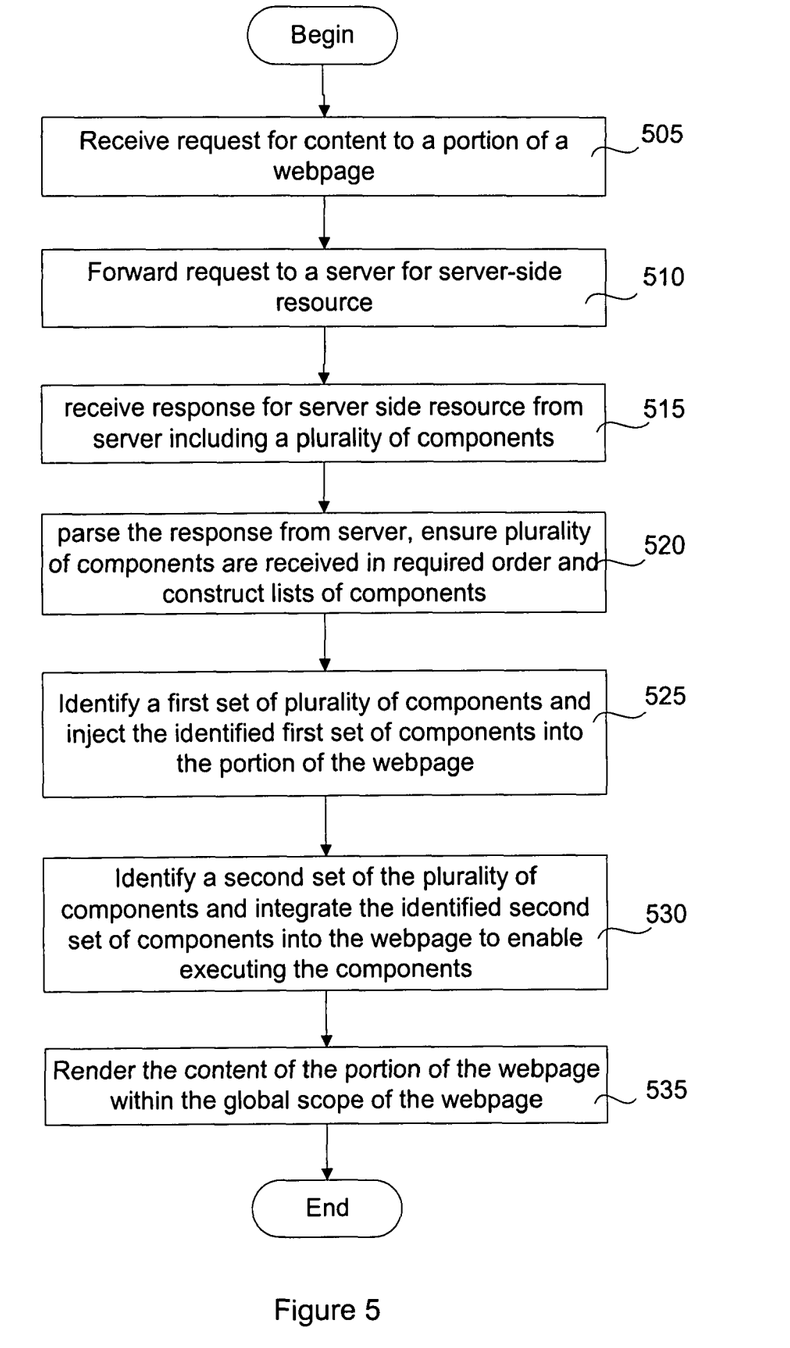
FIG. 5 illustrates a flow chart of client-side operations involved in dynamically loading content to a portion of a native global page, in one embodiment of the invention.
Figure 6:
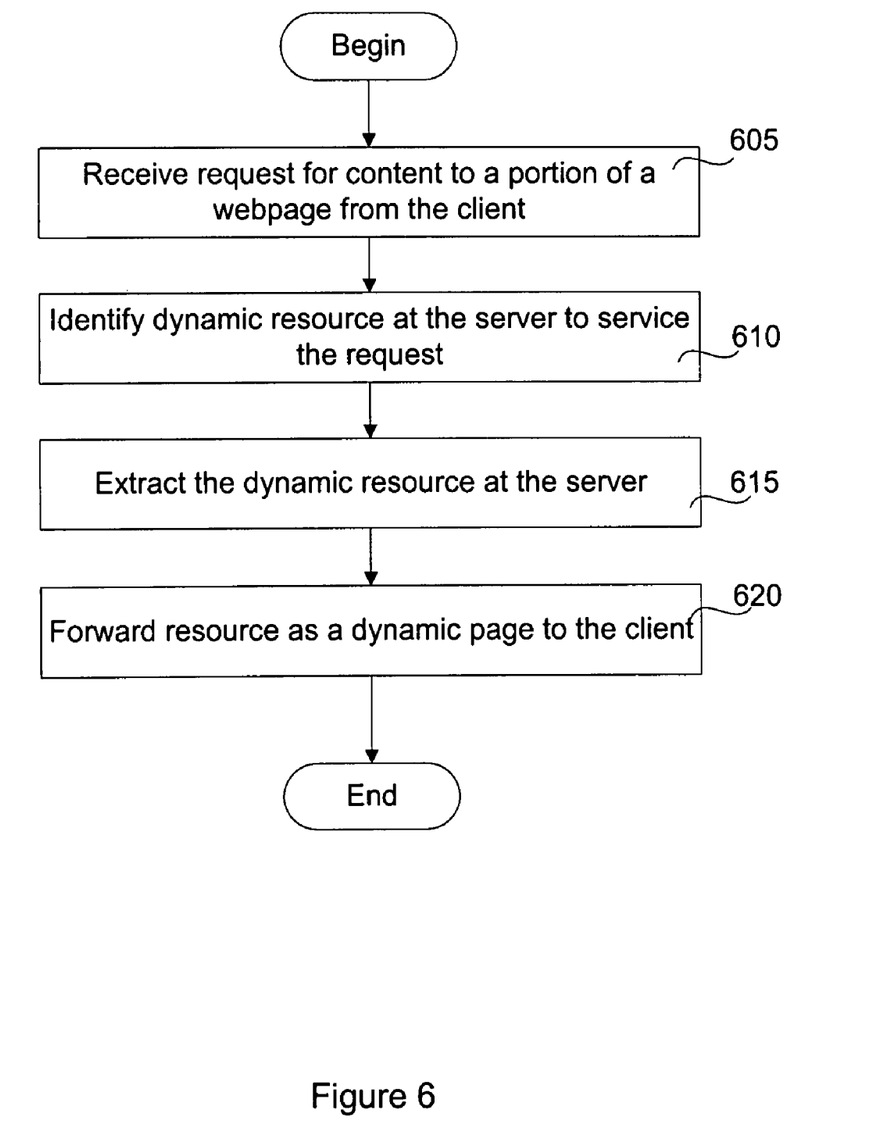
FIG. 6 illustrates a flow chart of server-side operations involved in dynamically loading content to a portion of a native global page, in accordance with one embodiment of the invention.

The method for dynamically loading content to a portion of a native global page (webpage) on a client 100 at runtime is now described in detail with reference to flow charts illustrated in FIGS. 4, 5, and 6. FIG. 4 illustrates the process operation involved in one embodiment of the invention. FIG. 5 illustrates the client-side operations involved in one embodiment of the invention. FIG. 6 illustrates the server-side operations involved in one embodiment of the invention.

The method begins at the client 100 when a request is initiated for content to a portion of the native global page (webpage) 101 rendered on the client 100, as shown in operation 405 of FIG. 4. The content may be for a portion of a webpage 101 that has not yet been rendered or that needs updating. The request from the client 100 could include content parameters such as an address to a server 200 in the form of a Uniform Resource Locator (URL) along with a plurality of other parameters that are used in identifying the request and the content. The request is triggered by an event related to the request on the client 100. The request is received by a JavaScript engine 110 on the client 100. The JavaScript engine 110 forwards the request along with one or more content parameters to the server 200 to which the request is mapped based on the content parameters, as shown in operation 410. Communication between the JavaScript engine 110 on the client 100 and the server 200 is done asynchronously.

An Injector servlet 210 on the server 200 receives the request along with the content parameters, analyzes the request and identifies server-side resource to service the request at the client 100, as shown in operation 415. The identified dynamic server side resource may include a plurality of components available to the server 200. The Injector servlet 210, upon receipt of the request, checks its cache for the resource, then a web root directory. If the identified resource is not available in the cache or the web root directory, the Injector servlet 210 proceeds to check resource files available to the server 200. In one embodiment, the Injector servlet may proceed to forward the request to an application program interface (API) such as Java Server Page (JSP) available on the server 200 that dynamically generates the identified resource upon receipt of the request. In another embodiment, the server-side resource may be available through a second servlet. In this embodiment, the Injector servlet 210 may forward the request to the second servlet on the server 200 or accessible to the server 200 requesting the identified server-side resource.

The Injector servlet 210 retrieves the plurality of components defining the dynamic server-side resource and returns the components to the client 100 asynchronously, as shown in operation 420. The components may be pooled together into a pooled response and the pooled response may be forwarded to the client 100.

The JavaScript engine 110 receives the plurality of components for the server-side resource forwarded by the Injector servlet 210, as shown in operation 425. The JavaScript engine 110 parses the plurality of components to ensure that the components are received in a required order and constructs one or more lists of components, as shown in operation 430. In one embodiment, the lists of components may be constructed based on the component type. The JavaScript engine 110 then identifies a first set of components from the lists of components and injects the first set of components into a region associated with the portion of the webpage 101, as shown in operation 435. The JavaScript engine 110 identifies a second set of components from the lists of components and integrates the identified second set of components with a global list of components pre-existing on the webpage 101 such that each of the components in the global list of the webpage 101 are distinct, as shown in operation 440. The method concludes with the rendering of the content for the portion of the webpage 101 on the client 100 within the global scope of the webpage 101, as shown in operation 445.

The client side operations are illustrated in FIG. 5. The client side operations begin with a request for a server-side resource initiated at a webpage rendered on a client 100, as illustrated in operation 505 of FIG. 5. The request is triggered by an event on the client 100. The request is analyzed and defined by a JavaScript engine 110 and forwarded to a server 200 to which the request is mapped, as shown in operation 510. The client 100 receives the server-side resource including a plurality of components from the server 200 in response to the request, as shown in operation 515. In one embodiment the response is received as a pooled response in a dynamic page 170. The JavaScript engine 110 parses the received response to verify that the plurality of components are received in a required order and constructs lists of components, as shown in operation 520. In one embodiment, the lists of components are constructed based on type of component. Upon verification and construction of lists of component, the JavaScript engine 110 identifies a first set of components from the lists of components and injects the first set of components into a region associated with the portion of the webpage 101, as shown in operation 525. The first set of components may be specific to the portion of the webpage 101 and hence can only be rendered in the context of the portion of the webpage. The injection of the components are carried out synchronously in the order they appear on the native global page 101. The JavaScript engine 110 identifies a second set of components from the lists of components, compares the second set of components against a global list of components associated with the webpage 101 and integrates those components that are not available on the global list, as shown in operation 530. The integration of the components into the global list of components enables the rendering of the components for the portion of the global page within the global scope of the webpage 101. The client-side operations conclude with the rendering of the content for the portion of the webpage 101 on the client 100 within the global scope of the webpage 101, as shown in operation 535.

The server side operations are illustrated in FIG. 6. The server side operation begins when a request is received for a server-side resource at a server 200 mapped to the client 100, as shown in operation 605. The request originates on the client 100 and includes content parameters that indicate the type of resource requested by the client 100. The type of request may include one of a static resource, dynamic resource, or resource from a resource file available to the server 200. In one embodiment, the request is for a dynamic server-side resource. An Injector servlet 210 on the server 200 receives the request and identifies a dynamic server-side resource on the server 200 to service the request, as shown in operation 610. The Injector servlet 210 checks a cache available on the server 200 for the server-side resource. If not available in the cache, then it proceeds to check the web root directory and then in the resource files available to the server 200. In one embodiment, the Injector servlet 210 forwards the request to a second servlet where the server-side resource is generated or to a Java Server Page (JSP) if the resource is generated dynamically by the JSP. The Injector servlet 210 extracts a plurality of components defining the server-side resource or receives the plurality of components for the dynamically generated server-side resource from the JSP or the second servlet. In one embodiment, the Injector servlet 210 pools the plurality of components received into a pooled response, as shown in operation 615. In one embodiment of the invention, the pooled response is a dynamic page. The server side process concludes with the Injector servlet 210 forwarding the pooled response to the client 100 in response to the request, as shown in operation 620.

The invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be obvious, however, to one skilled in the art, that the present invention may be practiced without some or all of these specific details. In other instances, well known process operations have not been described in detail in order not to unnecessarily obscure the present invention.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for dynamically loading content to a portion of a native global page on a client at runtime, the method comprising:
   receiving a request for the content for the portion of the native global page, the request identifying the portion of the native global page and a type of resource required from a server;
   forwarding the request from the client to the server, the request from the client identifying a server-side resource to service the request;
   receiving at the client the identified server-side resource, the identified server side resource including a plurality of components associated with the requested content for the portion of the native global page, wherein the plurality of components include dynamic resources that define style and format for rendering data associated with content of the server-side resource at the client;
   parsing the plurality of components at the client to ensure the plurality of components are received in a required sequence;
   when the plurality of components are received in the required sequence,
      constructing a plurality of lists of components from the plurality of components received from the server based on a type of component parsed, wherein each of the plurality of lists of components having components of a specific type;
      injecting a first selection of the plurality of components into a region for the portion of the native global page, the first selection of the plurality of components being specific to the portion of the native global page; and
      integrating a second selection of the plurality of components into a global list of pre-existing components for the native global page, wherein the integrated components are evaluated and executed so as to render the components for the portion of the webpage in the global scope of the native global page, and wherein the parsing, constructing, injecting and integrating are performed automatically at the client without user interaction.

2. The method for dynamically loading content to a portion of a native global page on a client at runtime of claim 1, wherein the request is triggered by an event at the client.

3. The method for dynamically loading content to a portion of a native global page on a client at runtime of claim 2, wherein the event is any one of page load or user selection.

4. The method for dynamically loading content to a portion of a native global page on a client at runtime of claim 1, wherein the request includes a plurality of content parameters.

5. The method for dynamically loading content to a portion of a native global page on a client at runtime of claim 4, wherein the content parameters include any one or more of request identifier, portion identifier, a region for the portion of the native global page to load the contents, a server identifier for requesting the server side resource.

6. The method for dynamically loading content to a portion of a native global page on a client at runtime of claim 1, wherein the server side resource is a dynamic server side resource presented at the client as a dynamic page.

7. The method for dynamically loading content to a portion of a native global page on a client at runtime of claim 6, wherein an Injector servlet on the server is configured to provide the dynamic server side resource to the client, the Injector servlet providing uniform access to the dynamic server side resource.

8. The method for dynamically loading content to a portion of a native global page on a client at runtime of claim 7, wherein the Injector servlet obtains the dynamic server side resource from any one of a server side cache, a root directory or a resource file available to the server.

9. The method for dynamically loading content to a portion of a native global page on a client at runtime of claim 1, further comprising:
   maintaining the global list of a plurality of components pre-existing on the native global page at the client.

10. The method for dynamically loading content to a portion of a native global page on a client at runtime of claim 9, wherein integrating one or more components from the server side resource further comprising:
   identifying a second set of one or more components from the plurality of components of the server side resource that are unavailable in the global list of components for the native global page; and
   updating the global list of components for the native global page with the identified second set of components of the server side resource so that the identified second set of components of the server side resource when executed at the client executes in the global scope of the native global page.

11. The method for dynamically loading content to a portion of a native global page on a client at runtime of claim 10, wherein the global list of components for the native global page are updated with the second set of identified components of the server side resource in the order they appear on the native global page.

12. The method for dynamically loading content to a portion of a native global page on a client at runtime of claim 1, wherein the server side resource is provided to the client asynchronously.

13. A system for dynamically loading content to a portion of a native global page on a client at runtime, the system comprising:
   a JavaScript Engine on the client to handle a request, the request triggered by an event on the client, the request defining a type of resource required from a server and the portion of the native global page from which the content request originated, the request including a plurality of content parameters, the JavaScript engine further including,
      a dynamic content receipt handler configured to receive a server side resource associated with the request based on the content parameters, the server side resource including a plurality of components associated with the requested content for the portion of the native global page, wherein the plurality of components include dynamic resources that define style and format for rendering data associated with content of the server-side resource at the client;

a resource parser configured to parse the received server side resource to identify the plurality of components, ensure the plurality of components are received in a required sequence, construct a plurality of lists of components from the plurality of components received from the server based on a type of component parsed, wherein each of the plurality of lists of components having components of a specific type, and to identify and inject a first set of components from the plurality of components into a region for the portion within the native global page in the order the components appear in the portion of the native global page, the first set of components being specific to the portion of the native global page;

a resource executioner configured to evaluate the received plurality of components of the server side resource and to identify and integrate a second set of components from the plurality of components into a global list of components pre-existing at the native global page in the order they appear on the native global page, wherein the second set of the plurality of components of the server side resource when executed renders the components for the portion of the webpage in the global scope of the native global page, and wherein the parsing, constructing, injecting and integrating of the plurality of components are performed automatically by the JavaScript Engine at the client without user interaction; and a server communicatively connected to the client, the server including an injector servlet, the injector servlet configured to receive the request forwarded by the JavaScript engine on the client, evaluate the request, identify a server side resource and to forward the identified server side resource to the client in response to the request received from the client, wherein the native global page includes at least one portion, the portion associated with a plurality of components and the server side resource includes a plurality of components.

14. The system for dynamically loading content to a portion of a native global page on a client at runtime of claim 13, wherein the content parameters identify a region for the portion within the native global page to inject the first set of the plurality of components of the received server side resource.

15. The system for dynamically loading content of a native global page on a client at runtime of claim 13, wherein the JavaScript engine is further configured to maintain a global list of components that pre-exist in the native global page.

16. The system for dynamically loading content to a portion of a native global page on a client at runtime of claim 13, wherein integrating a second set of plurality of components further comprising:
  a) identifying a second set of one or more components from the plurality of components of the server side resource that are unavailable in the global list of components of the native global page; and
  b) updating the global list of components of the native global page with the identified second set of components in the order the second set of components appear on the native global page so that the identified second set of components may be executed in the global scope of the native global page.

17. The system for dynamically loading content of a native global page on a client at runtime of claim 13, wherein the request from the JavaScript engine is for a dynamic server side resource and wherein the plurality of components from the server is for the dynamic server side resource, the dynamic server side resource presented by the server to the client as a dynamic page.

18. The system for dynamically loading content to a portion of a native global page on a client at runtime of claim 17, wherein the plurality of components associated with the server side resource presented in the dynamic page includes one or more of embedded JavaScript, embedded Cascading Style Sheet, JavaScript link, Cascading Style Sheet link, Hypertext Markup Language code that define the contents to the portion within the native global page.

19. The system for dynamically loading content to a portion of a native global page on a client at runtime of claim 13, wherein the injection servlet provides uniform access to a plurality of server side resources, the server side resource obtained from any one of server side cache, a root directory or a resource file available to the server.

* * * * *